Patented Jan. 30, 1934

1,945,270

UNITED STATES PATENT OFFICE 1,945,270

PROCESS FOR THE PURIFICATION OF 2-PHENYLQUINOLINE-4-CARBOXYLIC ACID AND ITS SALTS

William H. Glahn, Arlington, and Jacob Ehrlich, Belleville, N. J., assignors to Verona Chemical Company, North Newark, N. J., a corporation of New Jersey No Drawing. Application August 14, 1931
Serial No. 557,134

7 Claims. (Cl. 260—39)

Our invention relates to processes for the purification of 2-phenylquinoline-4-carboxylic acid and its salts and refers particularly to process for such purification by means of halogen compounds.

In the production of 2-phenylquinoline-4-carboxylic acid, to which compound we will hereinafter refer as cinchophen, colored substances and compounds are formed, which adhere to the cinchophen with such tenacity that it has not been found possible to obtain a practically colorless cinchophen of proper melting point by means of the ordinarily employed purification processes, such as crystallization from alcohol in the presence of an active decolorizing carbon.

Our process overcomes the above mentioned, and other difficulties incident to the purification of cinchophen and its salts and presents a means whereby cinchophen and its salts of practical whiteness and of proper melting point can be readily and economically obtained.

We have found that those colored impurities present in crude cinchophen which can not be removed by the ordinarily applied methods of purification, and which usually comprise the greater proportion of the impurities present, can be converted by our process into insoluble compounds which are readily removable as, for instance, by filtration.

The process of our invention consists in treating the crude cinchophen, or its salts, with a hypohalite of the alkali metal or alkali earth metal series, such as alkali or alkaline earth metal hypochlorite or hypobromite, whereby the colored by-products in the crude cinchophen or its salts which are not readily otherwise removable are converted into insoluble substances easily removable by ordinary purification processes, such as filtration.

We have found that our process is adapted for the treatment of cinchophen and its salts and is especially adapted for the treatment of cinchophen in the form of one of its salts, and we, therefore, prefer to treat either a neutral or slightly alkaline solution of a salt of cinchophen with sodium hypochlorite as hereafter described.

We give the following as one method of following the process of our invention:—

271 grams of the crude sodium salt of cinchophen and 27 grams of sodium carbonate are dissolved in water to a final volume of about 3 liters. This solution is warmed to about 95° C. to which, while stirring, there is added sodium hypochlorite containing 9½ grams available chlorine. The mixture is now stirred for about four hours, maintaining the temperature at about 95° C. At the end of this period any small amount of unchanged hypochlorite is eliminated by adding a small amount of sodium bisulphite, or other suitable reducing agent. The mixture is now cooled and filtered from the insoluble impurities. The purified sodium salt of cinchophen can now be converted into purified cinchophen and isolated by any suitable method.

If the above filtered sodium salt of cinchophen contains residual colored substances which have not been rendered insoluble by the hypochlorite and hence not removed by the filtration process, it may be treated, if desired with an active decolorizing carbon, and the cinchophen therefrom may be crystallized from alcohol in the presence of active decolorizing carbon in the usual method.

The sodium hypochlorite mentioned in the above example of our process may be replaced by sodium hypobromite, and akali earth salts of hypochlorous acid or hypobromous acid such as the calcium salts may also be employed.

The cinchophen thus obtained is considerably whiter and purer in quality than that obtainable by the processes hereto known and hence our process is a most valuable advancement in the art of purifying this compound.

We do not limit ourselves to the particular chemicals, times, temperatures, quantities, or steps of procedure particularly set forth as these are given simply as a means for clearly described the process of our invention.

What we claim is:—

1. In a process for the production of purified cinchophen, the steps which comprises warming crude cinchophen with a member of the group consisting of the alkali metal salts of hypochlorites and the alkali earth metal salts of hypochlorites, and separating the thus produced alkali- and water-insoluble colored substances from the cinchophen.

2. In a process for the production of purified cinchophen, the steps which comprise warming crude cinchophen with sodium hypochlorite and separating the thus produced alkali- and water-insoluble colored substances from the cinchophen.

3. In a process for the production of purified cinchophen, the steps which comprise warming a crude water soluble cinchophen alkali salt with a member of the group consisting of the alkali metal salts of hypochlorites and the alkali earth metal salts of hypochlorites, separating the cinchophen salt from the insoluble substances and converting said cinchophen salt into cinchophen.

4. In a process for the production of purified cinchophen, the steps which comprise warming a crude water soluble cinchophen alkali salt with sodium hypochlorite, separating the cinchophen salt from the insoluble substances and converting said cinchophen salt into cinchophen.

5. In a process for the production of purified cinchophen, the steps which comprise treating crude cinchophen with a water-soluble alkali salt of a hypohalite and separating the thus produced insoluble colored substances from the cinchophen.

6. In a process for the production of purified cinchophen, the steps which comprise treating a solution of crude cinchophen alkaline salt with a water-soluble alkali salt of a hypohalite, separating the thus produced insoluble colored substances from the cinchophen salt and converting said cinchophen salt into cinchophen.

7. In a process for the production of purified cinchophen, the steps which comprise treating crude cinchophen with a water-soluble alkali salt of a hypohalite and separating the thus produced alkali and water-insoluble colored substances from the cinchophen.

WILLIAM H. GLAHN.
JACOB EHRLICH.